May 28, 1940. J. E. WOLLENWEBER 2,202,073
LIQUID MEASURING AND DISPENSING DEVICE
Filed May 26, 1938  8 Sheets-Sheet 5
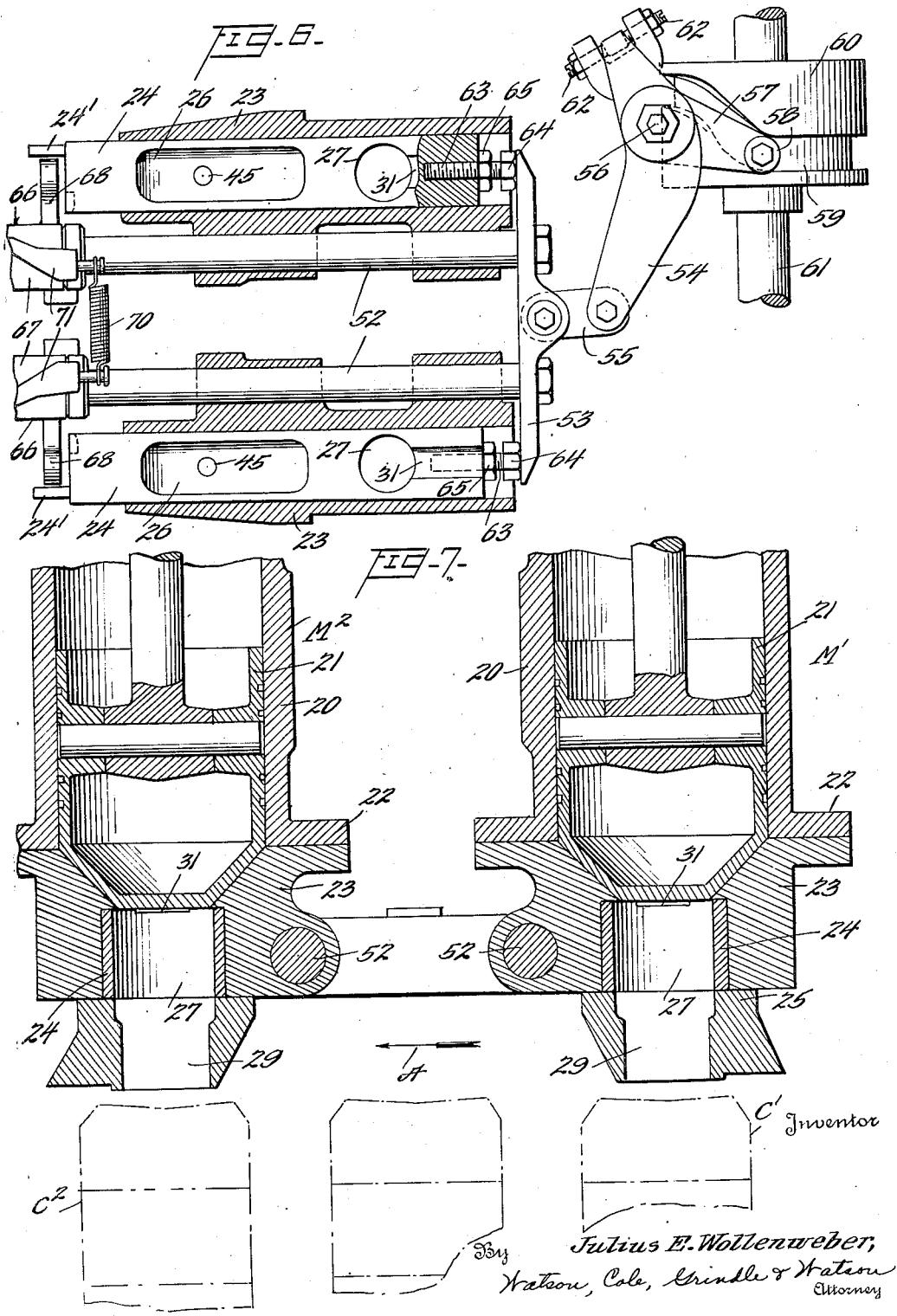
Inventor
By Julius E. Wollenweber,
Watson, Cole, Grindle & Watson
Attorney

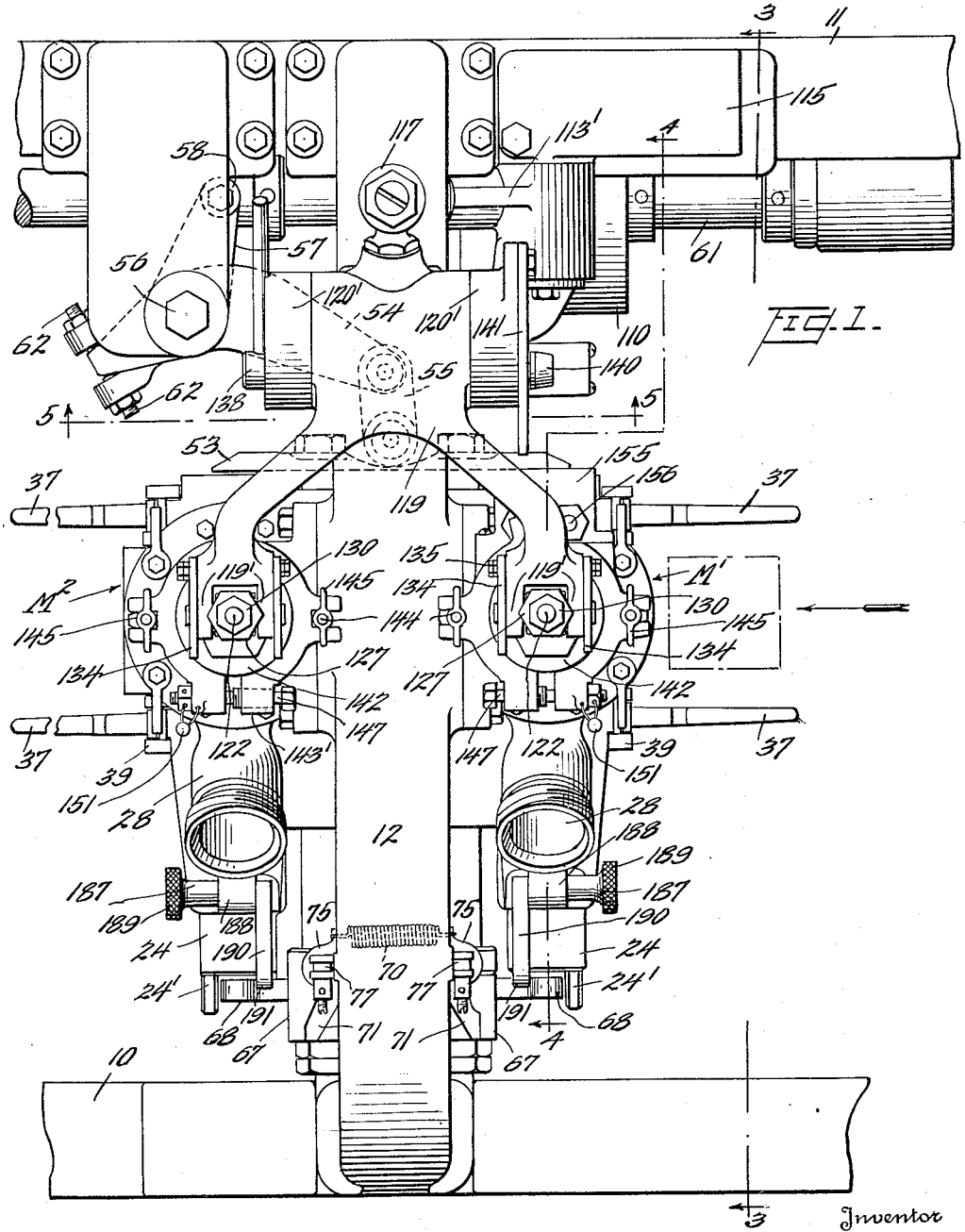

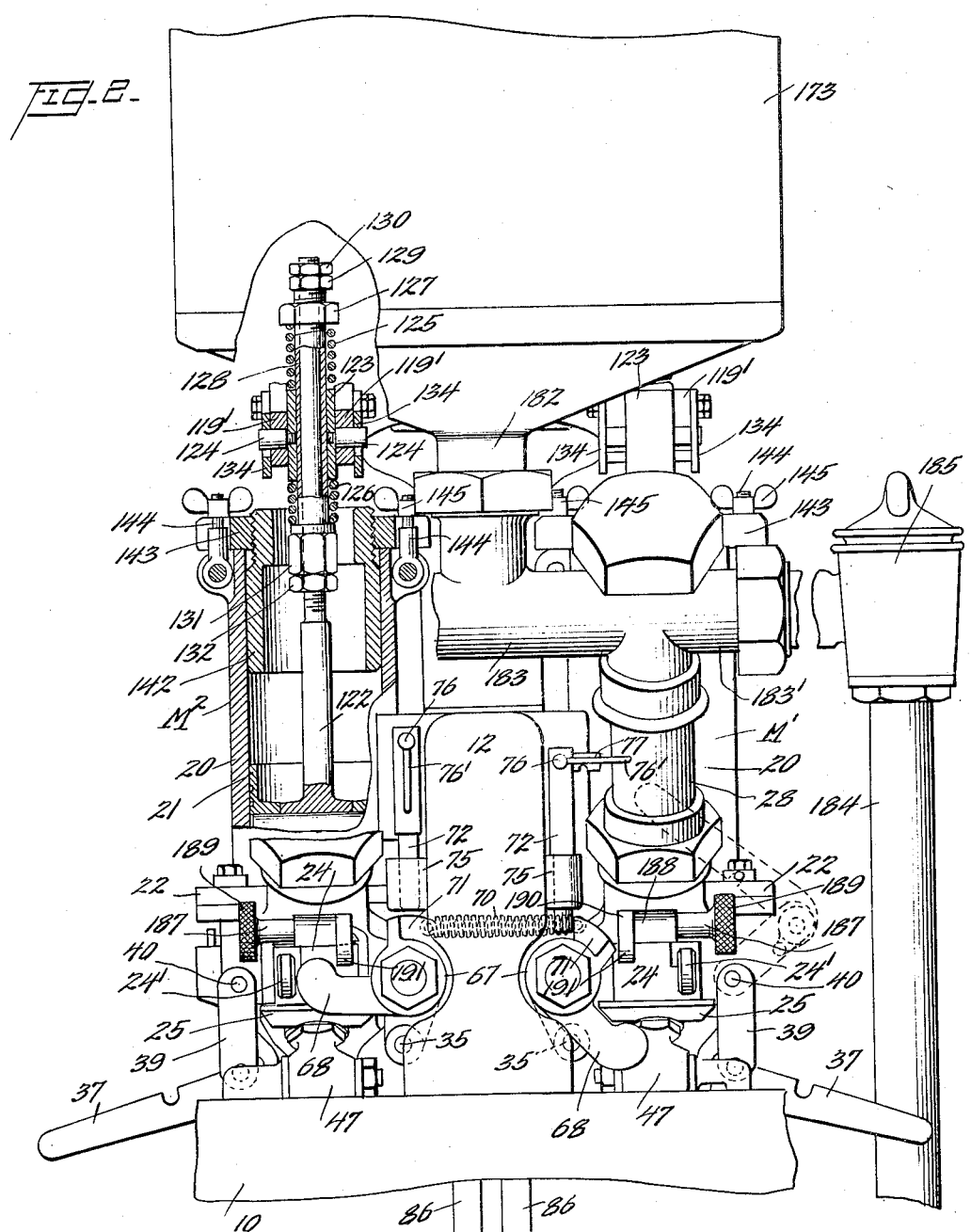

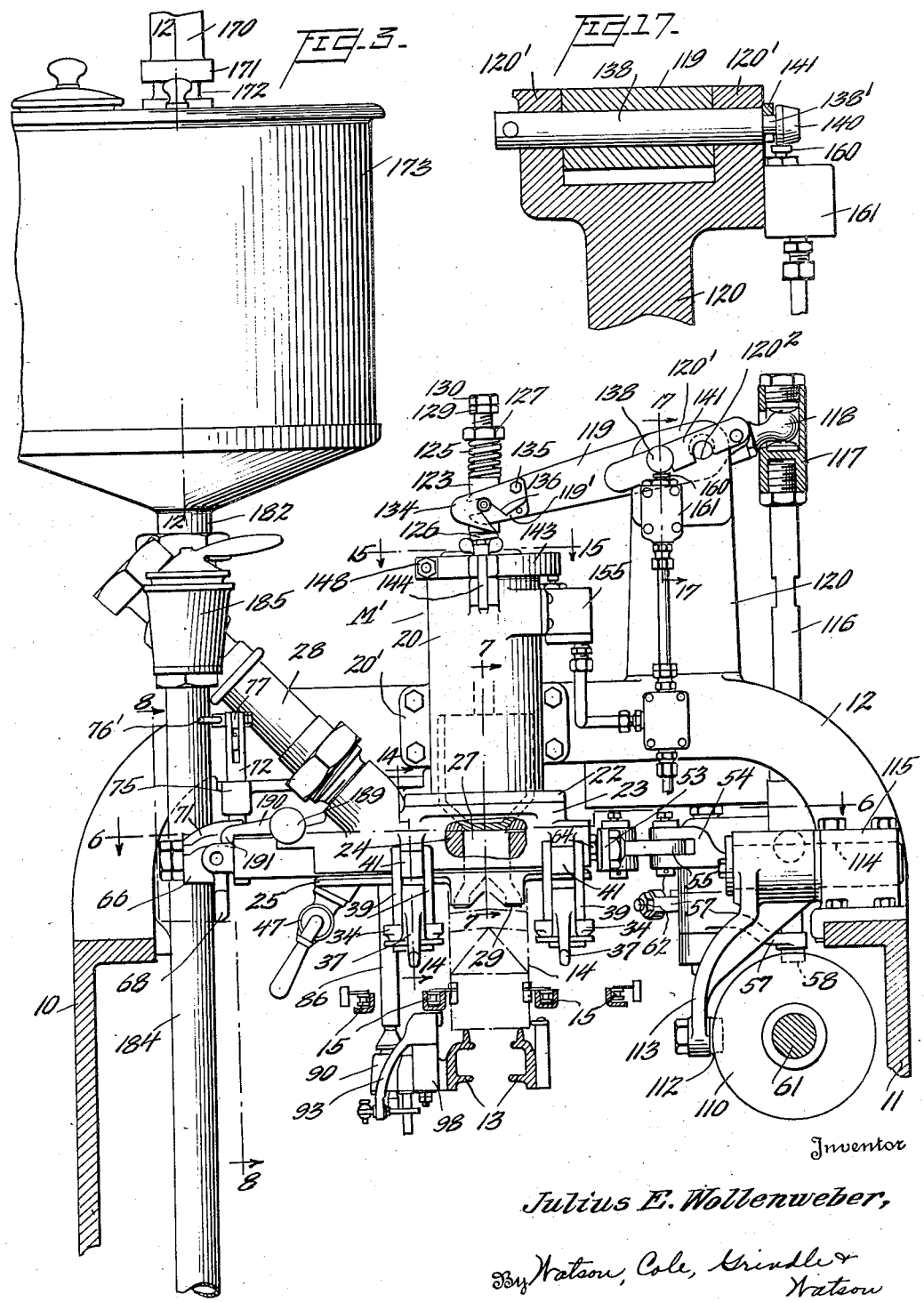

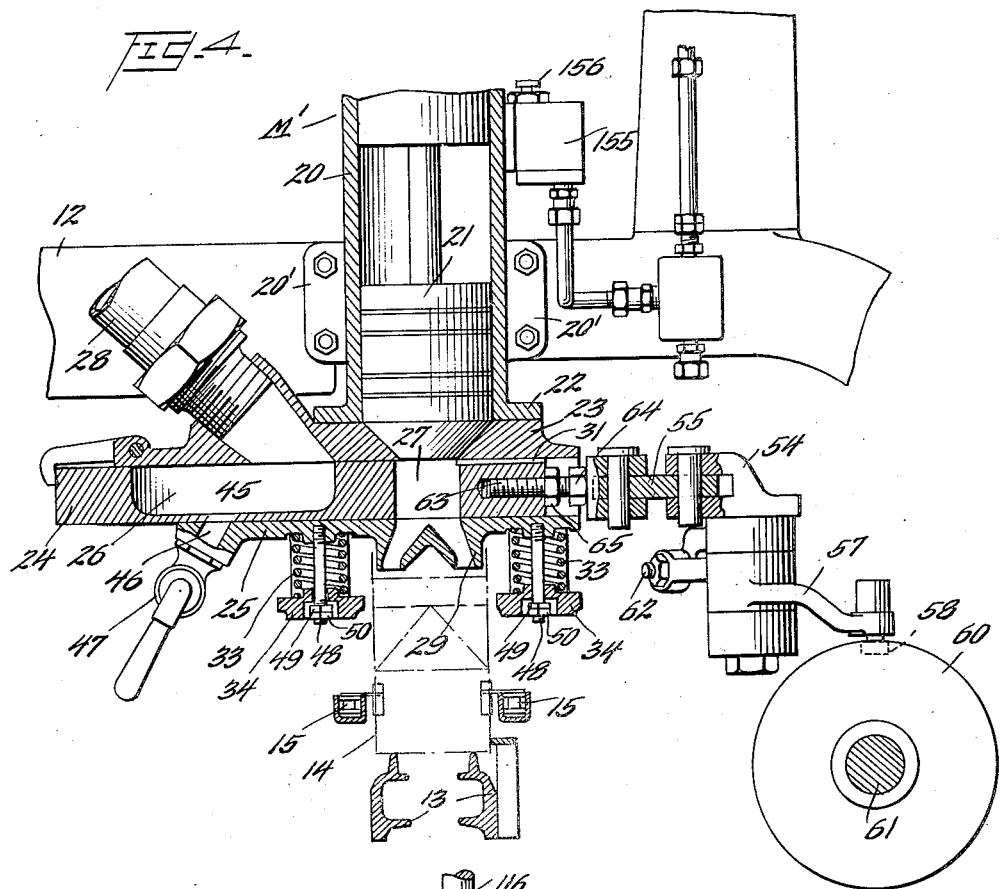
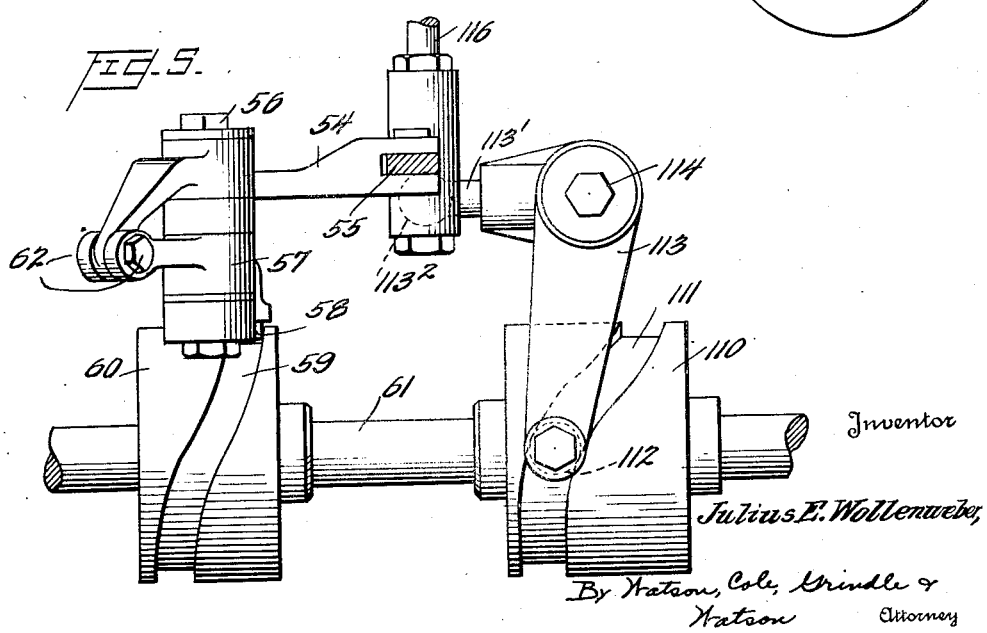

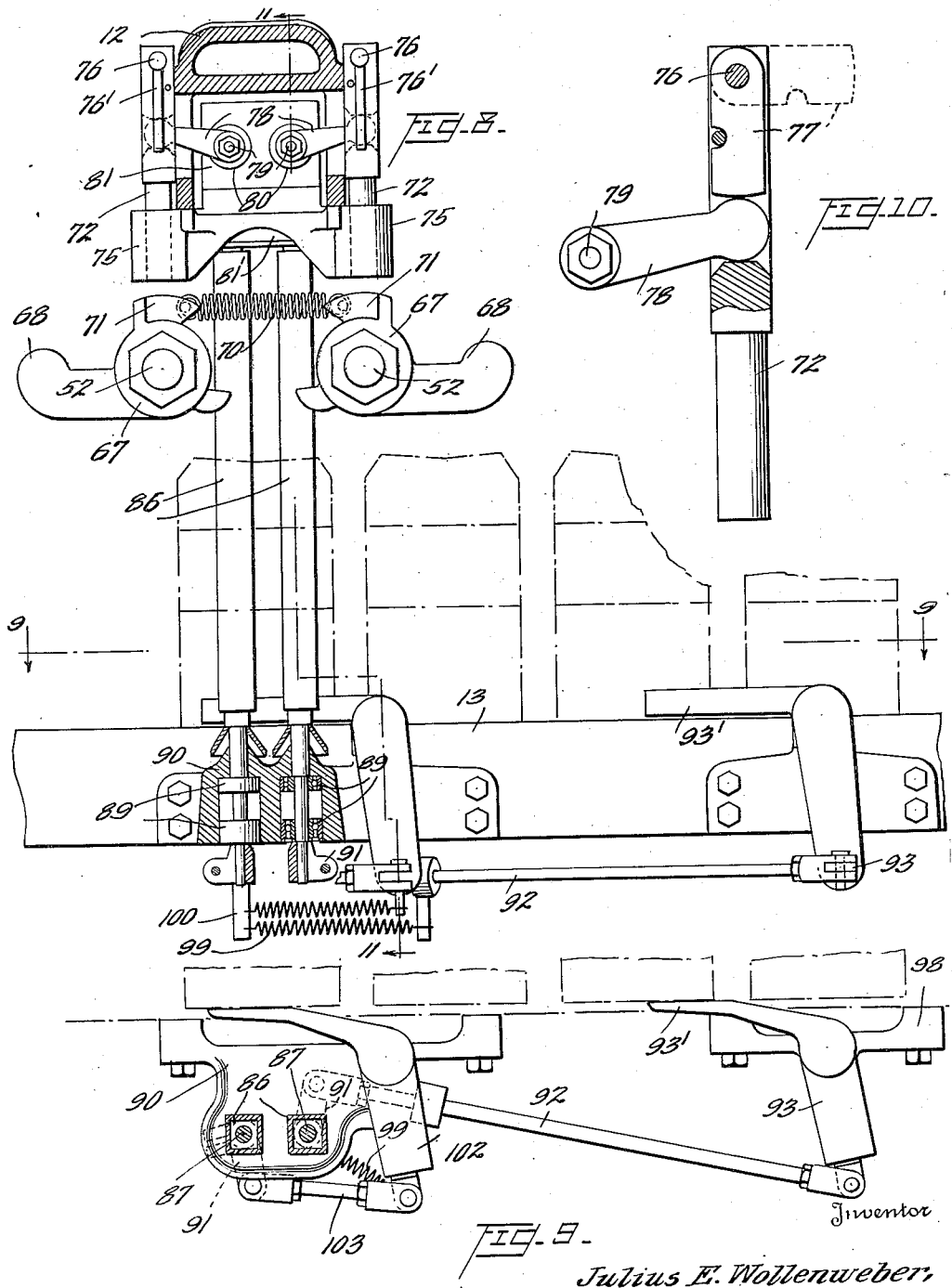

May 28, 1940.  J. E. WOLLENWEBER  2,202,073
LIQUID MEASURING AND DISPENSING DEVICE
Filed May 26, 1938  8 Sheets-Sheet 7
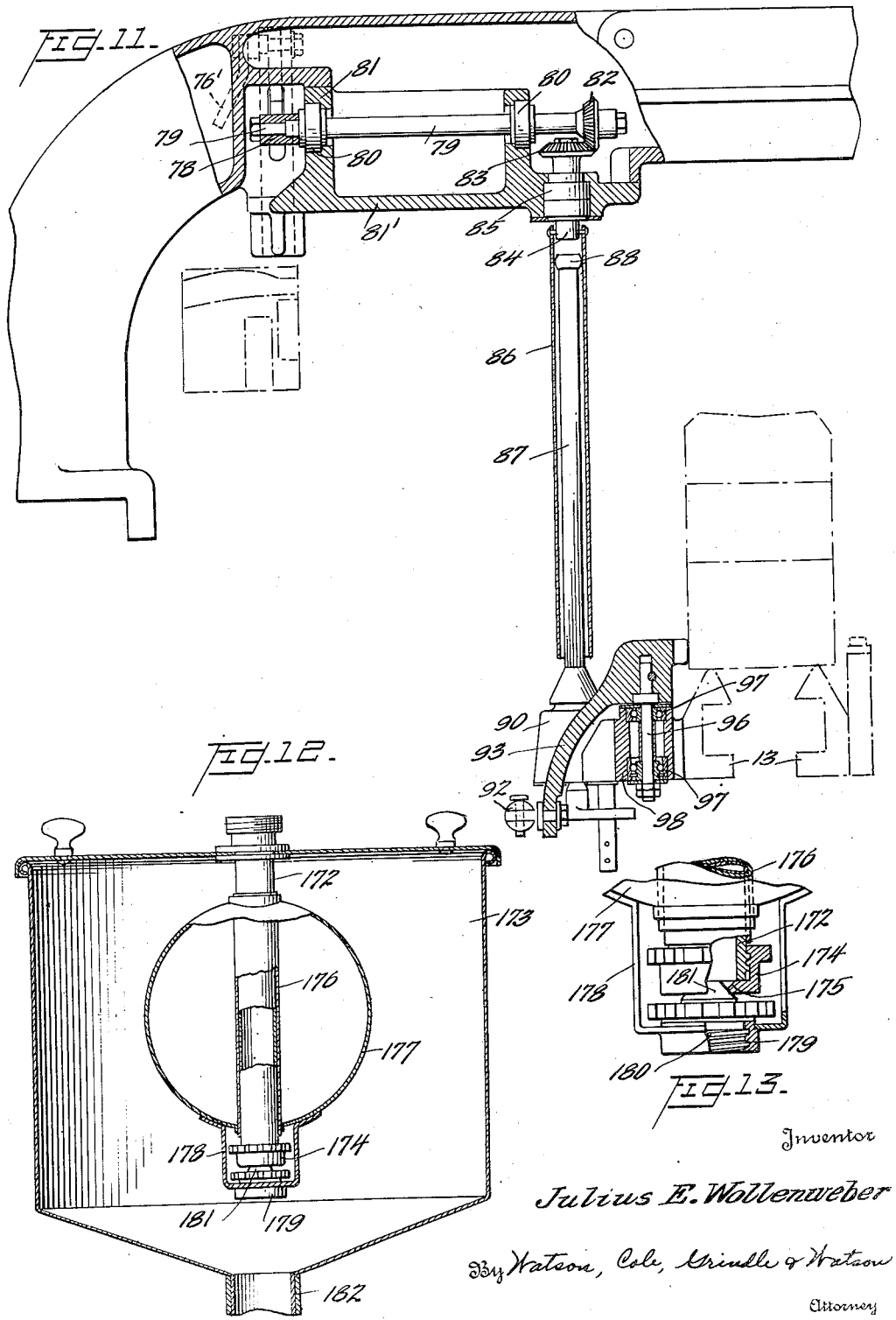
Inventor
Julius E. Wollenweber
By Watson, Cole, Grindle & Watson
Attorney

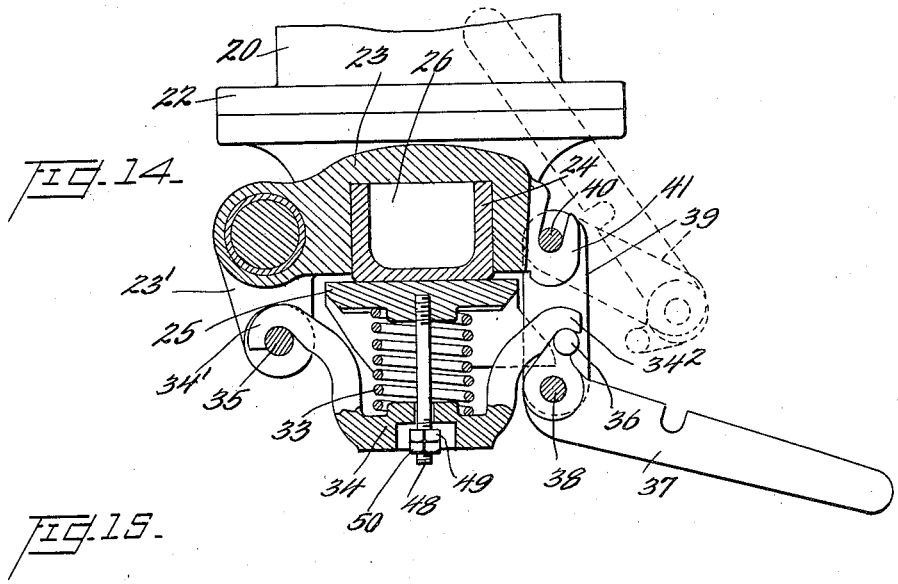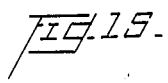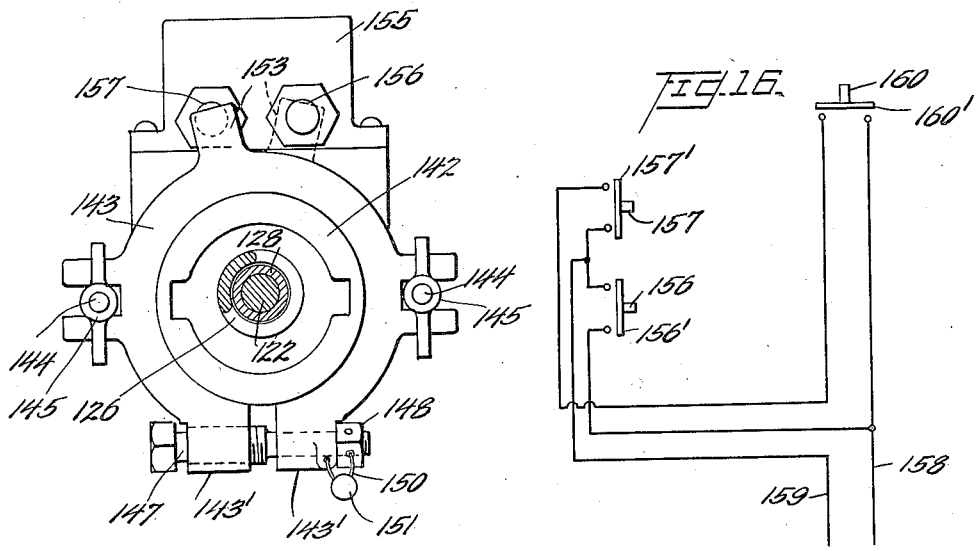

Patented May 28, 1940

2,202,073

UNITED STATES PATENT OFFICE 2,202,073

LIQUID MEASURING AND DISPENSING DEVICE

Julius E. Wollenweber, Detroit, Mich., assignor to The American Paper Bottle Company, Toledo, Ohio, a corporation of Ohio Application May 26, 1938, Serial No. 210,257

18 Claims. (Cl. 226—99)

In Patent No. 2,070,841, granted to C. W. Reade and Henry T. Scott February 16, 1937, there is disclosed a mechanism for handling liquids which, while designed and constructed so as to be capable of use in the handling or dispensing of liquids of all kinds, is particularly suitable for use in charging containers with carefully measured amounts or volumes of milk.

The present invention comprises an improvement upon the liquid handling mechanism which forms the subject matter of the patent just mentioned and includes also numerous features which may be advantageously used in connection with liquid handling mechanisms generally. It is likewise primarily intended for use in connection with the dispensing of liquid dairy products and is especially serviceable when employed as the container charging unit of a complete automatic machine for forming, charging, closing and sealing paper containers.

It is essential that a mechanism for handling dairy liquids, such as milk, be of such character that it can be maintained in a sterile condition. A further consideration of importance is accuracy, it being required that all mechanisms of this type deposit in each container charged exactly the right amount of liquid. A further requirement of such a mechanism is that it shall function rapidly, preferably in a wholly automatic manner, without wastage due to overflow or spillage, such for instance as might result from foaming of the liquid as it flows into a container.

While the liquid handling mechanism disclosed and claimed in the patent referred to quite successfully met, in actual use, the requirements above set forth, it has nevertheless been possible to further perfect and improve it in a number of respects so that its usefulness as a complete automatic container filling mechanism has been considerably increased. Thus by redesigning its essential elements in the manner hereinafter to be described, the mechanism has been rendered more sanitary in that its parts are of simpler design, more readily taken apart for the purpose of sterilization and more easily reassembled, the mechanism likewise having less tendency to permit leakage to occur when in operation, even after prolonged use. The liquid measuring portion of the apparatus has likewise been considerably improved and simplified, an important feature of the new design being the provision of means to insure the delivery by the mechanism of successive accurately measured volumes, such as quart volumes of liquids when quart volumes are required, and pint volumes when pint volumes are required, it being impossible for the operator to accidentally adjust the machine so that it will deliver pints when quarts are required or quarts when pints are required. Again, by rearranging the means, including the liquid supply tank and its connections, for supplying liquid to the volume measuring elements of the apparatus, an improved flow of liquid through the mechanism is secured, whereby there is less tendency for the formation of foam. The discharge nozzles through which the liquid is ultimately discharged into the container has also been redesigned and improved so that the tendency of the liquid to foam as it passes into a container is further reduced. Numerous additional elements of the mechanism have been simplified and refined so that the mechanism as a whole functions in an improved manner.

One form or embodiment of the invention is illustrated in the accompanying drawings, in which:

Figure 1 is a plan view of the entire mechanism;

Figure 2 is a side elevation, partly broken away to show more clearly certain of its details of construction;

Figure 3 is a section on line 3—3 of Figure 1;

Figure 4 is a section on line 4—4 of Figure 1;

Figure 5 is a section on line 5—5 of Figure 1;

Figure 6 is a section on line 6—6 of Figure 3;

Figure 7 is a section on line 7—7 of Figure 3;

Figure 8 is a section on line 8—8 of Figure 3;

Figure 9 is a section on line 9—9 of Figure 8;

Figure 10 is a view, on a larger scale, showing a portion of the mechanism illustrated in Figure 8;

Figure 11 is a section on line 11—11 of Figure 8;

Figure 12 is a section on line 12—12 of Figure 3;

Figure 13 is a view on a larger scale, and partially broken away of the float controlled valve mechanism shown in Figure 12;

Figure 14 is a section on line 14—14 of Figure 3;

Figure 15 is a section on line 15—15 of Figure 3;

Figure 16 is a wiring diagram illustrating the arrangement of circuits through several of the safety switches which comprise portions of the improved mechanism; and Figure 17 is a section on line 17—17 of Figure 3.

The liquid handling mechanism, as has previously been stated, is of general utility and its novel features may be embodied in mechanisms or apparatus which differ widely in appearance from that shown. That form of mechanism which has been illustrated by way of example has been designed for ready assembly as one unit of a complete automatic machine for forming, charging and sealing containers and in the drawings is shown to be supported upon portion of the frame members of such a machine. Thus in Figures 1 and 3 the numerals 10 and 11 indicate portions of the parallel elongated side frame members of the entire automatic machine and the various parts of the improved liquid dispensing or handling apparatus are supported either directly upon this frame or upon the inverted U-shaped bracket 12 which bridges the side frame members 10 and 11. The mechanism may of course be otherwise supported.

Parallel container supporting rails are indicated at 13 and a container resting upon these rails is indicated in chain lines (Figure 3) at 14. Parallel conveyor chains are indicated at 15 and, in the normal operation of the mechanism, an entire series of containers is mounted upon the supporting rails 13 and intermittently moved along these rails by the conveyor chains 15, each container being halted in two successive charge receiving positions as it passes under the bridging member 12 and the filling mechanism which is supported thereon. The container supporting rails 13 and the associated conveyor chains 15 are vertically adjustable so that containers of various heights may be passed through the machine without difficulty and in such manner that the top of each container, regardless of the height of the container, will during charging be positioned at the same distance from the mouths of the liquid discharge nozzles immediately above it, the mechanism being therefore able to accurately charge containers of various capacities with equal facility. The details of the container supporting and advancing mechanism need not be herein described since such details form no portion of the present invention, and any other suitable type of container supporting and advancing mechanism may be employed.

In Figure 7 paper containers, for instance of the type disclosed in the Henry T. Scott Patent No. 2,047,891, are indicated in chain lines to show their approximate spacing on the conveying means, which spacing is such that two containers are always in position to receive liquid from the charging apparatus in the normal operation of the machine, one container, indicated at C' in Figure 7, underlying the discharge nozzle of a first container charging unit indicated generally at M' and a second container, indicated at C², underlying the discharge nozzle of a second container charging unit, generally indicated at M². The direction of movement of the containers with respect to the filling units is indicated by the arrow A in this figure and each successive container, when brought into the position indicated at C', receives from the filling unit M' above it, one half of its total charge, whether it is of pint, quart, or half pint size, and when further advanced through an intermediate position to position C², receives the remaining half of its total charge, the charging being effected in two successive partial operations in order that any foam formed within the container when given its initial partial filling be allowed to subside before the remainder of the charge is introduced, thus avoiding the excessive foaming which tends to occur when the charge is introduced in its entirety in one filling operation. After being further advanced from the position indicated at C² in Figure 7, in the direction of the arrow A, the charged container is transmitted to mechanism for closing and sealing the same.

The two filling units M' and M² are illustrated in various views of the drawings, and are substantially identical in construction. Each comprises essentially a cylinder 20 with vertically disposed axis and provided with flanges 20' attached by means of bolts to the side of the bridging bracket 12, which bracket extends between the cylinders and rigidly supports them, a piston 21 slidably fitting within the interior of the cylinder, together with piston operating mechanism, liquid supply mechanism, and a slide valve for controlling the flow of liquid into and out of the cylinder.

From an inspection of Figure 4, it will be perceived that cylinder 20 is provided with an annular flange 22 at its bottom which engages the upper horizontal face of a block 23 and that the lower end of the piston 21 is frusto-conical and enters a similarly shaped recess in block 23 when the piston is in its lowermost position, the frusto-conical surfaces of piston and block closely engaging each other when the piston is so positioned and the cylindrical side wall of the piston closely engaging at all times the cylindrical wall of the cylinder 20. When lowered to the position shown in Figure 4, therefore, the piston completely fills the lower end of the cylinder and this is the position of the piston at the completion of its liquid discharge stroke, so that any liquid which has been drawn into the cylinder on the upstroke of the piston is completely discharged therefrom during its downstroke. The circular opening, coaxial with the cylinder, in the lower face of block 23, comprises a common liquid inlet and discharge port for the cylinder through which liquid alternately passes into the cylinder and is discharged therefrom. A valve 24 slidable in a horizontal plane transverse to the cylinder axis is operated in synchronism with piston 21 by means hereinafter to be fully described for the purpose of controlling the flow of liquid into and out of the cylinder, slide valve 24 comprising essentially an elongated plate, rectangular in transverse section, and having parallel upper and lower faces, the upper face of valve 24 seating against the lower face of block 23 and the lower face of valve 24 resting upon the upper face of valve supporting plate 25.

Valve 24 is provided with two liquid ports, an elongated port 26 which is formed as an upwardly opening recess in the body of the valve and a cylindrical port 27 which extends completely through the valve. The lower end of a conduit or duct for transmitting liquid downwardly to the upper face of the valve is indicated at 28, the mouth of this duct overlying valve port 26. A discharge nozzle which directly underlies the cylinder port is indicated at 29, preferably comprising an integral portion of valve supporting plate 25. It will be perceived that this discharge nozzle has two channels, angularly disposed, so that any fluid flowing downwardly therethrough is divided into two streams. The channels are so directed that the downflowing streams of liquid strike opposed vertical side walls of a container positioned below the same, liquid flowing downwardly over these wall surfaces to the container bottom, this for the purpose of minimizing foaming in the case that the liquid being thus discharged has a tendency to foam when agitated.

In Figure 4 of the drawings the valve 24 is shown in the position which it occupies during and at the completion of the discharge stroke of the piston 21. Prior to upward movement of the piston the valve is shifted so that port 27 is moved to the right, out of register with the cylinder port, and port 26 is likewise moved to the right so that it registers both with the discharge port at the lower end of the fluid supply conduit 28 and with the cylinder port. Subsequently to this positioning of the valve, the piston is elevated and, as it rises, fluid flows from conduit 28 through port 26 upwardly into the cylinder beneath the piston, the volume of fluid thus entering the cylinder being equal to the piston displacement and continuing so long as the piston moves upwardly. The fluid in the duct 28 is under static pressure and the liquid is forced into the cylinder by this pressure rather than drawn into the cylinder by suction resulting from the displacement of the piston, there being therefore no tendency for air to be drawn past the piston into the lower end of the cylinder as the piston is moved upwardly. After the conclusion of the charging stroke of the piston, the valve is again shifted to the position in which it is shown in Figure 4, the piston lowered, and the contents of the cylinder discharged into the container beneath, this cycle of operations being rapidly repeated during the operation of the mechanism. It will be understood that the companion filling or charging unit $M^2$ is identical in construction, is similarly supplied with fluid, and functions simultaneously, so that while one container is receiving the first half of its charge, a preceding container is receiving the second or final half of its charge.

It will be perceived that the diameter of the valve discharge port 27, which is cylindrical, is somewhat greater than the diameter of the cylinder port which lies directly above it when the valve is in the position shown in Figure 4, the margin of the cylinder port overlying or projecting inwardly beyond the wall of the cylindrical port 27. It will likewise be perceived in Figures 4 and 7 that an elongated shallow groove or recess 31 is formed in the upper face of the valve 24, the inner end of this groove opening into port 27, and the outer end being open to the atmosphere. It has been found highly desirable in actual practice to provide a liquid discharge port in the valve which is of larger diameter than the cylinder port and to likewise provide a duct or passage 31 leading from the valve port to the atmosphere in order that all of the liquid discharged from the cylinder through the cylinder port will promptly find its way to the container below. Without the provision of the duct 31 liquid will collect in the corner between the cylindrical wall of port 27 and the undersurface of the overhanging annular portion of the lower face of block 23 immediately above it, which liquid will move with the valve when retracted and destroy to some extent the accuracy of the charging operation, which must obviously be very precise. The specific arrangement of cylinder port, valve port 27, and relief port or duct 31 is therefore considered to be an important feature of the present invention.

As most clearly shown in Figures 4 and 14, the valve supporting plate 25 is urged upwardly by coiled compression springs 33, there being two of these springs, each having its upper end resting against the undersurface of the plate and its lower end resting upon a supporting bracket 34. Each such bracket is a generally U-shaped member one end 34' of which is hook-shaped and engages a stationary rod 35 supported upon downwardly extending flanges 23', rigid with block 23, the opposite and somewhat similarly formed end $34^2$ resting upon one end of a pin 36 at the end of the shorter arm of a lever 37. This lever is connected by means of a pivot pin 38 to the lower end of a link 39, link 39 having at its upper end a pin 40 which lies within a slot formed in a bracket 41 rigidly secured to block 23. The lever 37 may be rocked upwardly about the axis of pin 38 as a center, thus causing pin 36 to press horizontally against bracket 34 and swinging pin 38 outwardly on an arc centered on pin 40.

The initial upward rocking movement of lever 37 is opposed by spring 33, acting through bracket 34, and the bracket end $34^2$ will be moved upwardly slightly against the opposition of this spring. As soon, however, as the axis of pin 38 has passed the line of centers of pins 36 and 40, spring 33 becomes ineffective to oppose further movement of lever 37 which lever, and link 39, may then be swung upwardly into the position in which it is shown in dotted lines in Figure 14, the pin 36 being completely withdrawn from engagement with the bracket 34. After both brackets have been released in this manner the plate 25, together with the brackets and intermediate springs 33, may be removed as a unit, being readily lifted from rod 35. This assembly may be as readily replaced by simply reversing this sequence of operations and when the levers 37 are moved into full line position (Figure 14) the associated springs 33 will be placed under compression, so that the upper face of valve plate 25 closely engages the undersurface of the valve 24 and urges this valve upwardly so that its upper surface is at all times in close engagement with the valve seating surface of block 23.

It will be perceived also from Figure 14 that the valve 24 is laterally confined by block 23, the valve being in reality received within an elongated groove formed in the block. When the plate 25 is lowered the valve, if present, will fall and it is therefore preferred that the valve be removed by attaching a tool to the eye 24' at its end, provided for this purpose, and pulling it longitudinally from its operative position, prior to removal of plate 25. The general purpose of this construction is to provide a simple and efficient means for maintaining the slide valve in close engagement with the undersurface of block 23 and which will also automatically compensate for wear which may occur over the working surfaces of the valve and block, and also to provide a valve support construction which may be readily disassembled from the remaining portions of the mechanism for the purpose of sterilization, leaving the valve slide accessible for cleaning.

The small port 45 in the bottom of the valve duct 26 is adapted to register, with the valve in the position shown in Figure 4, with an offtake duct 46 formed in the valve plate, this duct being normally closed by a manually operable plug valve generally indicated at 47. The valve 47 may be opened to drain the valve port 26 and duct 28 of its liquid contents at the conclusion of a run of the machine and prior to bodily removal of the valve in the manner just stated. In order that the valve plate 25, supporting springs 33, and brackets 34 may be removed and replaced as a unit, each bracket 34 is loosely connected to valve plate 25 by means of a bolt 48, the upper end of which is threaded into a cylindrical aperture in the valve plate, and which passes through an aperture in bracket 34, its threaded lower end having an abutment nut 49 and a lock nut 50 thereon. When the parts are in the operative position shown in Figure 14, there is a slight clearance between the upper face of abutment nut 49 and the bracket 34.

Both valves 24 are simultaneously reciprocated by mechanism which is most clearly illustrated in Figures 4, 5 and 6. Parallel to each valve is a rod 52 each supported for longitudinal sliding movement in the associated block 23. One end of each rod 52 is fixedly connected to a crosshead 53, horizontally disposed, and the ends of which lie opposite the ends of the slide valves respectively. Crosshead 53 is operatively connected to a rocker 54 by means of a link 55, the rocker 54 being mounted for swinging movement about the axis of a pin, which is vertically disposed. Also mounted for rocking movement about pin 56 is a rocker 57, one end of which carries a roller 58 which projects into a cam groove 59 formed in a cam 60 mounted upon the horizontal rotary shaft 61. As shaft 61 and cam 60 are revolved, the rocker 57 is caused to swing or oscillate about the axis of pin 56 and, as shown in Figure 6, the end of rocker 57 remote from roller 58 is bifurcated and the end of rocker 54 remote from link 55 extends downwardly between the arms of this bifurcated end of lever 57. Adjusting screws 62 projecting through the arms of rocker 57 just mentioned contact with opposite faces of the end of rocker 54 so that rockers 54 and 57 are constrained to move simultaneously as rocker 57 is oscillated by cam 60. The two rockers thus together comprise in effect a single bell crank lever by means of which the motion of cam 60 is communicated to the link 55 and crosshead 53, which lever is in two parts adjustably connected together so that the angular relationship of the arms of the lever, and hence the position of the crosshead, may be adjusted as desired.

Each slide valve 24 carries at one end an adjusting screw 63, the head 64 of which rests against, but is not secured to, the adjacent face of crosshead 53. By turning screw 63 the distance between the valve and crosshead may be varied and each screw is provided with a lock nut 65 whereby it may be firmly clamped in adjusted position. Each rod 52 carries upon the end thereof remote from crosshead 53 a pusher member 66, each pusher having a cylindrical body portion 67 directly mounted upon rod 52 so as to be rotatable but not longitudinally movable thereon, and a laterally projecting wing 68 which, when in normal position, lies opposite the adjacent end of the associated valve 24.

When the pusher wings 68 are so positioned it is clear that, when rods 52 are moved to the right (Figure 6), the valves will likewise be moved to the right. Return movement of the valves is effected by the crosshead 53, acting upon the screw heads 64, and hence the valves are moved by forces applied to their ends alternately by the coaction of the operating parts described, and in the operation of the mechanism are reciprocated simultaneously by power derived from shaft 61 and in synchronism with the movements of the piston 21. The pusher wings 68 are normally maintained in valve engaging position by means of a spring 70, the ends of which are connected to the pusher members, respectively, and maintain these members in contact with fixed rotation limiting stops.

It is highly desirable that either or both of the valves be rendered inoperative automatically in the event that, for one reason or another, the conveying mechanism fails to bring a container beneath one or both of the discharge nozzles of the mechanism. Means is therefore provided for displacing either or both of the pusher wings 68, thus rendering it inoperative and incapable of moving the associated valve toward discharge position, thereby preventing wastage of liquid in the event that a container fails to be placed below either or both of the liquid discharge nozzles just prior to the time when liquid is to be discharged. This mechanism will be now described.

Each pusher 66 has fixed thereon a cam 71 and each such cam is adapted to be engaged by a vertically disposed pin 72, these pins being directly above the paths of cams 71 but being mounted so as to be downwardly movable into the paths of movement of the cams in the event of a failure in the supply of containers. When the pusher wings 68 are positioned as shown in Figure 6 the valves will be moved to the right when rods 52 and crossheads 53 are moved in this direction. In the event that the automatic means indicates the absence from the conveyor of a container, so that one valve should not be operated but should be lifted in the position in which it is shown in Figure 6, it is necessary of course that the corresponding wings 68 be depressed or moved to inoperative position. This movement of wing 68 to inoperative position is accomplished by the associated pin 72 which pin is lowered into the path of movement of cam 71 while the valve assembly is at the right-hand limit of its movement. Therefore, when the valve assembly is forced to the left, this pin 72 engages the left-hand cam face of cam 71 of the pusher member 76, thereby causing the pusher wing to move downwardly. During the next movement to the right of the crosshead 53 and bars 52 the depressed pusher wing will pass to the left and below the bottom face of the associated valve. Hence no movement of this valve will occur during the movement of the remainder of the valve assembly toward the right and hence there will be no discharge of milk or other liquid from the nozzle controlled by this valve until the pin 72 has been lifted out of the path of movement of cam 71. The pusher wing of the right-hand pusher, illustrated in Figure 2, is shown in such depressed position and the pusher wing of the left-hand pusher is shown in operative position so that, were the crossheads and rods 52 to be operated at this time, only the left-hand valve would be advanced, the right hand valve remaining stationary. If both pins 72 are lowered, both valves will remain stationary.

Pins 72 are slidably housed in cylindrical vertical apertures formed in the ends of the transverse bracket member 75 secured to the bridging member 12. The upper end of each pin is, above bracket 75, enlarged and vertically slotted, as shown in Figure 3. Extending transversely across each such slot, at the upper end thereof, is a rotatable pin 76 upon which is fixed the swinging abutment 77, which may be, by means of a lever 76' fixed to the end of pin 76, moved from the position in which it is shown in full lines in Figure 10, to the position in which it is shown in dotted lines in the same figure. Abutment 77 normally occupies the position in which it is shown in full lines in Figure 10 and its lower end directly overlies one end of an arm 78, extending in a generally horizontal direction, the other end of this arm being fixed upon a horizontal shaft 79 mounted for rotation in bearings 80 supported in vertical webs 81 of a box-like member 81' rigidly attached to the main transversely extending supporting bracket 12.

Shaft 79 carries at the end thereof remote from the arm 78 a small bevel gear 82 the teeth of which are in constant mesh with those of a similar bevel gear 83 mounted upon the upper end of a short vertical shaft 84 rotatably supported in a bearing 85 carried by the member 75

81. To the lower end of shaft 84 is pivotally attached the upper end of an elongated sleeve 86, which is square in cross-section, this sleeve having its lower end in proximity to the container supporting and advancing means. Projecting upwardly within sleeve 86 is a rod 87 having at its upper end a head 88 which, while curved in vertical section, is rectangular in horizontal section so that, when rotated, its rotary motion will be transmitted to sleeve 86. The rod 87 may freely move vertically within the sleeve 86 as the conveyor supporting and advancing mechanism is raised or lowered. The lower end of rod 87 is mounted in bearings 89 supported in a bracket 90 rigidly attached to the side of one of the conveyor supporting rails 13 and the reduced lower end extension of rod 87 projects below bracket 90 and has fixed thereon a laterally projecting arm 91.

To the outer end of arm 91 is pivotally connected one end of a link 92, the opposite end of which is pivotally connected to the end of a lever 93 having a horizontally projecting extension 93' the inner face of which is adapted to engage containers advanced along the container supporting rails 13. It will be observed from an inspection of Figure 11 that the throw-out lever 93 is mounted for pivotal movement about the axis of a vertically disposed supporting shaft 96, the lower end of which is mounted in spaced bearings 97 supported in a bracket 98 also fixed to the side of supporting rail 13. A spring 99 having one end connected to the link 92 and its opposite end connected to a pin 100 projecting downwardly from bracket 90, normally urges link 92 to the left (Figure 9) and hence urges the lever 93 to rotate in a clockwise direction so that the inner surface of arm 93' of this lever is normally pressed against the side of advancing containers or, should no container be present to prevent movement of this lever, the spring will become active to rock this lever in a clockwise direction, movement of the lever being unopposed.

When such rocking movement of the lever 93 occurs, the vertical shaft 87 to which it is operatively connected by means of link 92 and arm 91 will likewise rotate, thus causing rotation of the sleeve 86, shaft 84, horizontal shaft 79, and hence downward movement of arm 78, thus depressing pin 72 and bringing its lower end into the path of movement of the cam 71 of the associated valve pusher. With the pin 72 in this position, as has previously been stated, the associated pusher will be rocked and its pusher wing deflected downwardly out of valve engaging position so that the valve may not be moved when crosshead 53 and rods 52 are actuated and no liquid will hence be discharged, thus avoiding waste, as there is no container beneath the discharge nozzle to receive the liquid. It will of course be understood that two container detecting mechanisms are provided, and two such mechanisms are illustrated, one associated with each valve. The operations of the mechanisms are identical, however, and their constructions essentially the same, although the second container engaging lever, indicated at 102, is horizontally spaced from the lever 93 and the link 103 is considerably shorter than the link 92. If it is desired to permanently throw either valve out of operation, the associated manually operable lever 76' is rocked to swing the corresponding abutment member 77 to inoperative position. When this is done pin 72 will drop and will remain in its lowered position until manually lifted, thus throwing one valve out of operation and rendering ineffective one of the charging units until abutment member 77 has again been moved into operative position.

The piston operating mechanism includes a cam 110 also fixed on shaft 61, this cam being cylindrical and having a cam track 111 which receives a roller or follower 112 which follows the cam track as the cam is revolved. Roller 112 is mounted upon the end of one arm of a rocker 113 mounted for rocking movement about the axis of a horizontally disposed arbor or stub shaft 114 projecting inwardly from a securing bracket 115 mounted upon the frame member 11. The horizontally disposed arm 113' of this bell crank lever is provided at its end with a ball 113² which is housed within the lower end of a vertically extending push rod 116. Push rod 116 has fixed upon its upper end a sleeve 117 which receives a ball 118 connected to one end of a rocker 119. Rocker 119 is pivotally supported upon the upper end of a pedestal or bracket 120 rigidly secured to frame member 12 and the free ends of the diverging arms of this rocker, which is bifurcated, overlie respectively, the cylinders 20 of the two filling units M' and M².

The pistons 21 are connected to the ends of the arms of rocker 119 by means of piston rods 122, each piston rod being pivotally connected to the associated piston and extending upwardly therefrom to a point substantially above the top of the cylinder and between parallel fingers 119' projecting from the ends of the arms of the rocker. Slidably mounted upon each rod 122 is a sleeve 123 and this sleeve is connected to the adjacent end of the arm of rocker 119 in such manner that it will be moved vertically by and with the rocker and to the same extent. Thus, diametrically opposed pins 124 have their inner ends secured to sleeve 123 and these pins lie within notches formed in the ends of parallel fingers 119' at the end of the rocker arm, comprising pivot pins connecting the sleeve and rocker. Encircling each piston rod 122 above sleeve 123 is a coiled spring 125 and a similar spring 126 is located below this sleeve, the adjacent ends of the springs bearing against opposite ends of the sleeve. A nut 127 threaded on a tube 128 which encircles piston rod 122 comprises the upper abutment of spring 125, tube 128 being held against upward movement relatively to the piston rod by abutment and locking nuts 129 and 130 threaded on the upper end of this rod.

The lower end of tube 128 rests against the upper end of a nut 131, threaded upon the piston rod and held in definite position by means of a lock nut 132. Nut 131 comprises an abutment for the lower end of the lower spring 126. Latches 134 on opposite sides of the rocker end, rotatably supported upon pins 135 and provided with notches 136, retain pins 124 within the notches in the end of rocker 119 provided for their reception. When these latches are lifted the piston rods may be disconnected from the rocker 119. Rocker 119 is mounted for rocking movement upon a pivot pin 138 which passes through aligned apertures in the spaced upwardly extending flanges 120' of pedestal 120 and also through the rocker 119, which lies intermediate these flanges, as shown in Figure 17. A projecting end of pin 138 has a neck 138' of reduced diameter and a frusto-conical end portion 140 as shown clearly in Figure 17. The pedestal 120 is provided with two laterally spaced sets of apertures to receive the pin 138 and the rocker 119 is likewise provided with two laterally spaced pin receiving apertures so that the movement of the rocker may be about either of two fulcrum points or axes. By shifting pin 138 the axis about which the rocker 119 moves may be horizontally shifted, the operator being thus able to modify the relative vertical movements of the two ends of the rocker at will. The pivot pin 138 is retained in position in either case by means of a swinging latch 141 which engages the reduced neck of the pin 138'. In Figure 3 the pin is shown to be in its left-hand position and the vertical movements of the ends of the rocker, during operation of the mechanism, are very nearly equal, the pin being very nearly equidistantly spaced from the ends of the rocker. When the pin 138, however, is shifted to the two right-hand apertures in the flanges 120', one of which is indicated at 120², it is then much closer to the right-hand end of the rocker than to the left-hand end and a given vertical movement of the rounded end 118 of the rocker will cause a much greater movement of that end of the rocker which is connected to the piston rods.

With the pin in the position shown in Figure 3, oscillation of the rocker will bring about travel of the pistons such as to give one-half pint piston displacements in the cylinders whereas with the pin in its right-hand position, or in apertures 120² of the pedestal 120 the pistons will be reciprocated in the cylinders to give volumetric piston displacements of one pint. In this way the filling unit is adjusted to fill pint or quart containers.

The actual vertical movement of each piston in its cylinder, however, must be most accurately controlled and the operating mechanism described is not relied upon to effect such accurate displacement. Thus each cylinder is provided with a stop, one of which is indicated at 142 in Figure 2. This stop is in the form of a hollow cylinder the lower portion or skirt of which closely fits the cylinder wall and the reduced upper portion of which is externally threaded and projects above the cylinder. It is supported in the position in which it is shown by means of a ring 143 which rests upon the annular upper edge of the cylinder 120 and is detachably secured to such cylinder by swinging bolts 144 provided with wing nuts 145. The annular lower edge of sleeve 142 comprises a stop for the piston and upward movement of the piston immediately terminates when its upper edge strikes this sleeve.

Whatever the adjustment of pin 138 may be, the arrangement is such that the sleeve 123 moves both upwardly and downwardly a distance, when the rocker is oscillated, somewhat greater than the possible travel of the piston, the downward movement of the piston being of course limited by its contact with the lower end of the cylinder wall, and its upward movement by sleeve 142, and the excess of vertical movements or travel of sleeve 123 over that of the piston simply results in the alternate compression of the springs 125 and 126. By this arrangement, therefore, the piston may be moved very precisely between fixed stops by an actuating mechanism which includes a member to which the piston is connected, which member is moved to greater distances, without, however, subjecting the piston to shock and without requiring a precisely built piston operating mechanism.

For the stop 142 which is shown in Figure 2, and which is intended to permit a volumetric piston displacement of one-half pint, a shorter stop may be substituted, permitting the piston to have a one pint volumetric displacement. Thus stop 142 may be removed from the stop supporting ring 143 and the shorter stop inserted in this ring. As will be perceived in Figure 15, the ring 143 is split, having enlargements 143' at its ends. A bolt 147 has threaded engagement with the wall of a cylindrical aperture formed in one of these enlarged ends and has a reduced portion which extends through an aligned cylindrical aperture in the other end portion 143'. A nut 148 is threaded upon the projecting end of this reduced portion by means of which the ends 143' of the ring 143 may be drawn tightly together to clamp the end of the stop 142. After the nut 148 has been turned to clamping position a wire 150 may be passed through an aperture in this nut and through an aperture in the adjacent end 143' of the ring, the ends of the wire being connected by a seal 151, for instance a lead inspection seal. The ring cannot be removed from the stop, or alternatively, the stop cannot be removed from the ring, unless the seal is broken or the wire is cut, thus insuring that the piston displacement cannot be altered without the knowledge of a responsible party.

It will be observed that the ring 143 has projecting therefrom a lug 153, which is angularly spaced from a radial line normal to a diameter projected through the securing bolts 144. Ring 143 is also so formed that either annular surface may be uppermost or lowermost, these surfaces being parallel. Obviously if its position is reversed, the lug 153 will occupy a different position from that in which it is shown in full lines in Figure 15, i. e., it will be shifted to the position in which it is shown in dotted lines in this figure. It is intended that, in the use of the apparatus, a half pint stop shall be inserted, when used, into the ring from one side and a pint stop, when used, from the other side, suitable legends being inscribed on the ring to make this clear to the operator. Hence when the pint stop has been affixed to the ring, one face of the ring will be in contact with the upper end of the cylinder and when the half pint stop is affixed thereto, the opposite face of the ring will rest upon the upper edge of the cylinder.

A switch box is indicated at 155 and the projecting ends or buttons of two switch operating plungers or elements at 156 and 157 respectively. The lug 153 of the ring 143 will engage and depress one or the other of these switch operating elements when the ring is positioned and the element which is so engaged will depend upon the position of the lug 153, i. e., whether a pint stop or a half pint stop has been attached to the ring 143. In the wiring diagram (Figure 16), the wires 158 and 159 are mains connected to a power source, through the motor which actuates the cam shaft 61. The switch operating elements 156 and 157 are diagrammatically shown and switch blades to which these elements are connected are diagrammatically indicated at 156' and 157'. A further switch operating element is indicated at 160 and a switch blade at 160'. The switch blade 160' is enclosed within a switch box 161 (Figure 3) immediately underlying pin 138 and, with this pin in operative position, its head 140 engages and depresses the switch blade and closes the circuit at this point.

When the mechanism is arranged to fill pint containers, i. e., each filling unit arranged for one-half pint piston displacement, the rocker 119 is pivoted as shown in Figure 3 and the stop supporting ring is arranged as shown in full lines in Figure 15. Plungers 157 and 160 are both depressed and the motor circuit is complete so that the mechanism is operative. Were the fulcrum pin 138 in its right-hand position, however, or pint delivery position, the plunger 160 would not be depressed and the mechanism would not operate. Hence possible breakage due to movement of the piston against a half pint piston stop, at the time that the rocker is adjusted for a full pint measuring movement, is avoided. With the ring, piston stop, and rocker adjusted for full pint piston displacement, the plunger 156 is depressed by lug 153 and the motor circuit thus completed. When the ring is not in position upon the cylinder the machine is of course inoperative.

Liquid to be measured and dispensed is brought to the apparatus through an overhead pipe or conduit 170 the upper end of which is connected by a coupling 171 to the upper end of a pipe 172 which projects vertically downward into the constant level tank 173. Upon the lower end of this pipe 172 is threaded a cup-shaped member 174 which comprises an adjustable valve seat, having a frusto-conical upwardly tapering valve seating surface 175. By rotating member 174 this valve seat may be vertically adjusted. Slidably mounted upon pipe 172 is a tube 176 upon which is fixed a spherical float 177, the axis of the float coinciding with the axes of pipe 172 and tube 176.

A strap 178 attached to the undersurface of float 177 carries a sleeve 179 into which is threaded a cylindrical member 180 which carries a frusto-conical valve 181 adapted to engage the correspondingly shaped valve seat 175. Both valve and valve seat are thus readily detachable for the purpose of cleaning and sterilization, a very important advantage. When liquid has entered the tank 173 to a desired level the valve 181 will seat and further flow be interrupted until the liquid level falls. Member 174 may also be removed and another, with discharge aperture of different diameter, inserted. This may be done to obtain best operating performances despite differences in static head of the liquid being supplied.

A downtake conduit 182 leads from the bottom of tank 173 to the midpoint of a horizontal manifold 183 and this manifold is in communication with the two conduits 28 leading to the filling unit valves. Manifold 183 has an extension 183' connected to downtake pipe 184 through valve 185. Normally valve 185 is closed but is opened when it is desired to drain the tank 173 and manifold of its contained liquid. It has been found that the precise arrangement of tank and liquid distribution pipes illustrated is particularly advantageous when the mechanism is handling a liquid which has a tendency to foam when agitated. It insures a steady flow of liquid to the valves under constant static pressure.

All parts of the mechanism which may ordinarily come into contact with the liquid being dispensed are fabricated of rust-resisting metal and most of these parts are so mounted and connected together that the mechanism may be readily dismantled for the purpose of sterilization. The manner in which the valves and valve supporting plates may be removed has been previously described. It may be added, however, that, to prevent accidental displacement of a valve when the corresponding pusher wing has been displaced, each has associated therewith a limit latch which must first be displaced before a valve can be drawn from its operative position. These latches are illustrated in Figures 1 and 3, each comprising a rotatable part 187 mounted in a fixed bearing 188 and having a knurled operating button 189, the latch proper being indicated at 190 and having a downturned end 191 which lies in the path of movement of the adjacent valve. Before removal of a valve this limit latch must be lifted.

While in the foregoing specification it has been stated that both filling units are employed in the charging of any container, regardless of the size of the container, each unit introducing one-half of the total charge, this procedure need not necessarily be carried out. Thus, in charging liquids which have little tendency to foam, one filling unit may be employed to completely fill containers of all sizes, the other being rendered inoperative if desired. In charging a liquid such as milk, it is found possible to use one filling unit only to fill containers of small capacity, such as half pints and pints, and desirable to use both units to charge the taller containers, such as quarts, this by reason of the fact that the amount of foam created is much greater when a relatively large quantity of milk is charged into a tall container than when a relatively small quantity is introduced into a shorter container. By providing two adjustable filling units, the operator is enabled to modify the action of the mechanism to suit his needs, in view of the type of container to be charged and the nature of the liquid being handled.

Having thus described the invention, what is claimed as new and desired to be secured by Letters Patent is:

1. In a liquid dispensing apparatus, in combination, a liquid chamber having a discharge port leading downwardly therefrom and terminating in an aperture formed in a seating surface for a slide valve, a slide valve closely seating against said surface and having a port formed therein which may be brought into or out of register with said aperture, said valve having a duct formed therein which leads from the upper end of said valve port to a point of communication with the atmosphere whereby air under atmospheric pressure may freely enter said port at all times.

2. The combination set forth in claim 1 in which said duct comprises a groove or recess formed in the seating surface of the slide valve.

3. The combination set forth in claim 1 in which the aperture and valve port are circular in cross-section, and the diameter of the valve port is larger than the diameter of the said aperture.

4. The combination set forth in claim 1 in which the aperture and valve port are circular in cross-section, the diameter of the valve port is larger than the diameter of said aperture, and the duct comprises a groove or recess formed in the seating surface of the slide valve.

5. A liquid dispensing apparatus comprising a cylinder, a piston slidably supported therein for movement between fixed stops, a rocker, means supporting the rocker for oscillation about any one of a plurality of axes, and means including a resilient element connecting the piston and rocker.

6. A liquid dispensing apparatus comprising a cylinder, a piston slidably supported therein for movement between fixed stops, a rocker, means supporting the rocker for oscillation about any one of a plurality of axes, a piston rod pivotally connected to said piston, a slide on said rod operatively connected to one end of said rocker, and yielding means for communicating motion of the slide to the piston rod.

7. A liquid dispensing apparatus comprising a cylinder, a piston in said cylinder, stop means for the piston whereby the piston may be positively stopped at various points in its travel, a rocker connected to the piston, and means for modifying the rocking movement of the rocker in accordance with the piston travel.

8. The combination set forth in claim 7 in which said last mentioned means comprises a shiftable fulcrum upon which the rocker is mounted for oscillation.

9. A liquid dispensing apparatus comprising a cylinder, a piston, piston actuating means, stop means whereby the piston travel may be positively stopped at one of a plurality of points, adjustable piston actuating mechanism including a motor circuit and means for varying the piston travel, and a switch in the motor circuit which is closed by the stop means only when the stop is arranged to halt the piston at a point approximately corresponding to the end of the piston stroke as determined by the piston actuating mechanism.

10. The combination set forth in claim 9 in which the stop means includes a member adapted for attachment to the cylinder in any one of a plurality of positions, and the switch is engageable by said member in one operative position of said member.

11. A container charging mechanism comprising in combination, a liquid discharge nozzle, a valve controlling the flow of fluid to said nozzle, a conveyor for containers, valve operating means, and automatic means for rendering the valve operating means inoperative when no container is presented to the discharge nozzle, said automatic means including a manually adjustable member which, when moved to one position renders said automatic means inoperative and when moved to a second position renders said automatic means operative.

12. The combination set forth in claim 11 in which said member is pivotally mounted upon a reciprocable element forming portion of the automatic means.

13. The combination set forth in claim 11 in which the automatic means includes a reciprocable element having opposed abutments between which a second element of said means is normally located, so that movement of said second element results in reciprocation of said first element, one of said abutments being manually adjustable relatively to said first element so that the operative connection between said elements may be broken when desired.

14. In a liquid dispensing apparatus, in combination, a chamber for a liquid having a discharge port in its bottom, means for effecting the discharge through said port of a precisely measured volume of liquid, a valve chamber below and in communication with said port, and a valve slidable in said chamber and having a discharge port extending vertically therethrough to permit the free downward flow of liquid discharged from said chamber when said valve and chamber ports are in register, the area of the valve port being greater than that of the chamber port so that the edges of the chamber port are out of contact with the valve when said ports are in registration, said valve having a duct therein which leads from the upper end of the valve port to the atmosphere, whereby atmospheric air may enter said port at all times, and means for sliding said valve.

15. In a liquid dispensing apparatus, in combination, a chamber for a liquid having a discharge port in its bottom, means for effecting the discharge through said port of a precisely measured volume of liquid, a valve chamber below and in communication with said port, and a valve slidable in said chamber and having a discharge port extending vertically therethrough to permit the free downward flow of liquid discharged from said chamber when said valve and chamber ports are in register, the valve and cylinder ports being similar in horizontal section but all horizontal dimensions of the upper end of the valve port being greater than the corresponding dimensions of the chamber port so that the edges of the chamber port overhang the valve port when said ports are in register, said valve having a duct therein which leads from the upper end of the valve port to the atmosphere, whereby atmospheric air may enter said port at all times, and means for sliding said valve.

16. In a liquid dispensing apparatus, in combination, a receptacle for a liquid having a discharge port terminating in an aperture formed in a member having a seating surface for a slide valve, a plate having a valve seating surface disposed parallel to said first mentioned valve seating surface, a ported valve intermediate said surfaces, and means securing said plate in position to support said valve, said means including a supporting bracket connected to said member at spaced points on opposite sides thereof, one of said connections comprising a quick detachable connection, and resilient means resting on the bracket and engaging the plate.

17. In a liquid dispensing apparatus, in combination, a receptacle for a liquid having a discharge port terminating in an aperture formed in a member having a seating surface for a slide valve, a plate having a valve seating surface disposed parallel to said first mentioned valve seating surface, a ported valve intermediate said surfaces, and means securing said plate in position to support said valve, said means including a supporting bracket connected to said member at spaced points on opposite sides thereof, one of said connections comprising a link one end of which is pivotally connected to said member and a lever pivotally connected to the free end of the link and the end of one arm of which normally engages the bracket at a point outside of a line connecting the pivotal axes of the link and lever, and resilient means interposed between and tending to separate the bracket and plate.

18. In a liquid dispensing apparatus, in combination, a receptacle for a liquid having a discharge port terminating in an aperture formed in a member having a seating surface for a slide valve, a plate having a valve seating surface disposed parallel to said first mentioned valve seating surface, a ported valve intermediate said surfaces, and means securing said plate in position to support said valve, said means including a supporting bracket connected to said member at spaced points on opposite sides thereof, one of said connections comprising a lever operated quickly detachable device, and the other comprising a hook detachably connected to said member.

JULIUS E. WOLLENWEBER.